June 10, 1969  E. R. CORDOVA  3,448,701
MOTORIZED LAZY-SUSAN TABLE
Filed Nov. 22, 1967
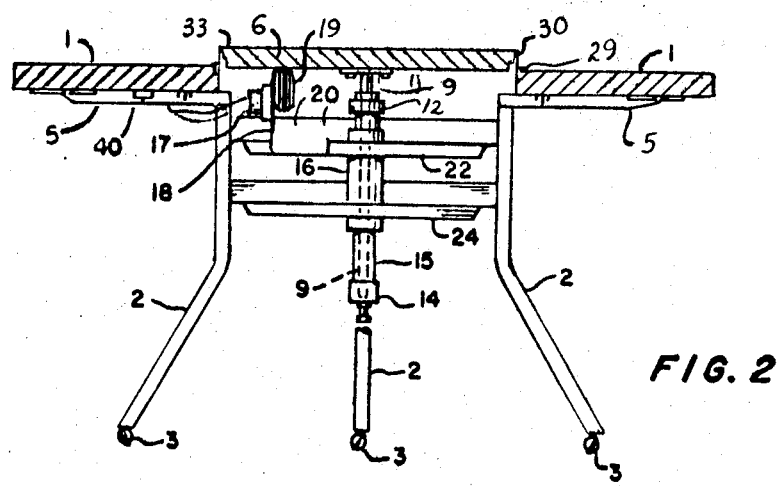
FIG. 2
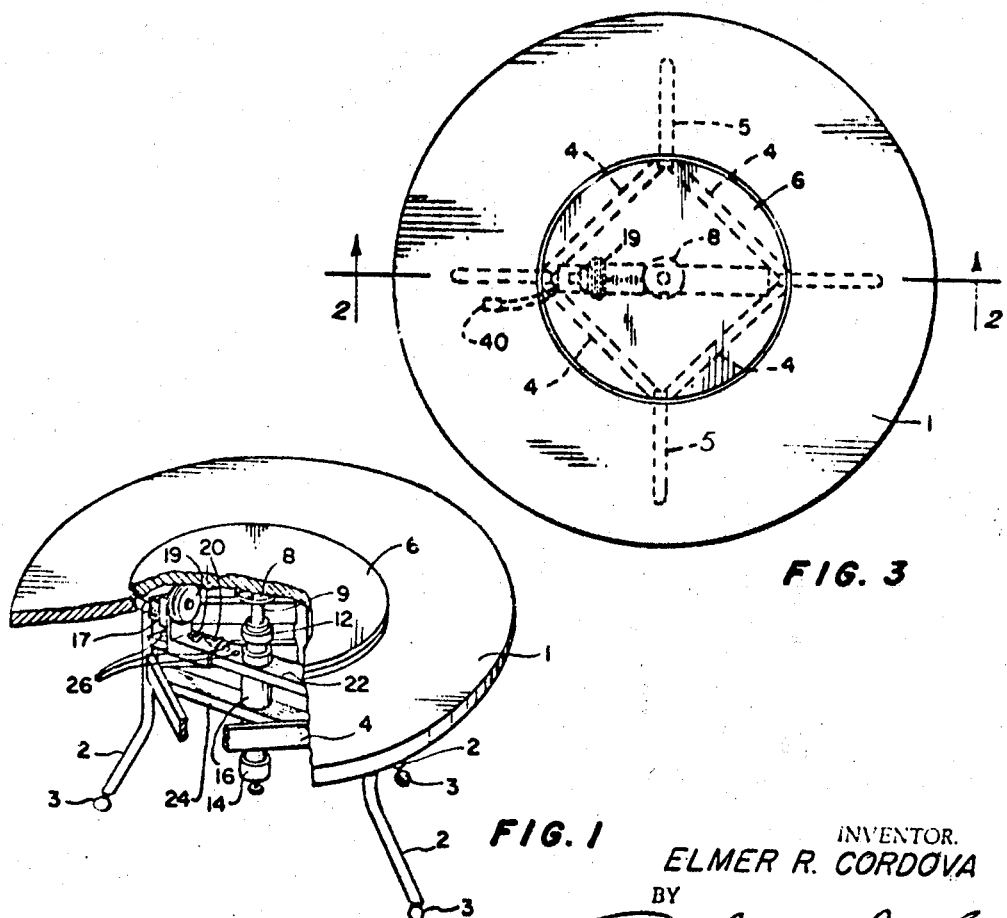
FIG. 3
FIG. 1
INVENTOR.
ELMER R. CORDOVA
BY
*Richard D. Law*
ATTORNEY

United States Patent Office 3,448,701
Patented June 10, 1969

3,448,701
MOTORIZED LAZY-SUSAN TABLE
Elmer R. Cordova, 5801 S. Santa Fe Drive,
Littleton, Colo. 80120
Filed Nov. 22, 1967, Ser. No. 685,172
Int. Cl. A47b 85/00, 11/00
U.S. Cl. 108—20         5 Claims

ABSTRACT OF THE DISCLOSURE

A variable speed, motorized lazy-susan table having a stationary table portion and means of support for same includes a revolving portion supported by a shaft resting on a thrust bearing set and powered by an electric motor having a soft rubber wheel in frictional contact with said revolving portion.

---

A revolving lazy-susan table according to my invention, includes a stationary outer portion with legs as means of support, and an inner, revolving portion supported by a vertical shaft resting on a thrust bearing mounted on said legs. The shaft, also, being supported more or less midway thereof by a radial bearing set. Means of providing motion for said revolving portion is a friction drive with power supplied by an electric motor radially adjustably supported on a lateral brace member. The friction drive includes a soft rubber tired wheel mounted on said electric motor.

The invention provides economy in the production of the lazy-susan table by cutting the revolving portion from the center of the stationary portion and attaching one molding to the revolving portion and one to the edges of the hole in the stationary portion to provide an overlap which acts as a bearing surface in the event of tipping of the rotary portion.

It is, therefore, among the objects and advantages of my invention to provide a revolving lazy-susan table arranged for operation under heavy, unbalanced loads and which is provided with a variable speed rotating portion.

It is a further object of my invention to provide a revolving lazy-susan table that can be stopped while in motion and said stopping will not harm the drive mechanism.

A still further object of the invention is to provide a lazy-susan table mode from a single table top and provding an overlap of a rotary portion and stationary portion so as to have a bearing surface therebetween in the event of tipping of the rotary table portion.

Other features and advantages will become readily apparent to those skilled in the art from a study of the detailed description set forth hereinafter and the appended drawings in which:

FIG. 1 is a perspective view, partially cut away, disclosing the drive mechanism of a motorized lazy-susan table according to the invention;

FIG. 2 is a cross-sectional side-elevation of the device of FIG. 1; and

FIG. 3 is a top plan view thereof.

The revolving lazy-susan table, shown in the illustrations, includes a stationary table portion 1 mounted on legs 2, preferably mounted on swivel casters 3 for mobility. The legs are rigidly secured in position by circumferential braces 4 attached to the legs. The stationary table portion 1 is supported on the legs by radial braces 5 adding stability to the table. A revolving portion 6 is mounted on a vertical shaft 9 by means of plate 8 secured to the bottom side of the rotary portion. The shaft 9 is telescoped in a support tube 15, and is supported in rotatable position by an adjustable thrust bearing 14 at its lower end and intermediate its ends by radial bearing 12. The tube 15 is supported by a sleeve 16 mounted between upper lateral brace 22 and lower lateral brace 24. The upper radial bearing set 12 and lower thrust bearing 14 are mounted on the tube 15. The radial bearing set 12 and the thrust bearing set 14 are set a substantial distance apart to prevent oscillation or wobbling of the shaft under unbalanced loads on the table. The thrust bearing is vertically adjustable to maintain clearance between the two table parts and prevent undue play in the shaft.

The driving mechanism consists of an electric motor 17 mounted on a spring metal angle 18 for holding a soft rubber tire 19 mounted on the shaft of the motor firmly against the underside of the revolving table portion 6. The metal strip 18 includes portions bent around upper lateral brace member 22, and is adjustably secured by wing nuts or the like 20 on the brace 22. The brace may be slotted to accommodate bolts for the wing nuts for slidable adjustment of the motor radially of the rotary table portion. The upper lateral brace member 22 may, also, have holes at any desired interval equal to the distance between the holes in metal angle 18 for adjustment. These holes or a slot allow the electric motor 17 to be moved radially closer to or farther from the tube 15 or center of rotation for varying the speed of the revolving table portion 6.

The revolving table portion 6 is cut from the stationary portion but is constructed so as to overlap the stationary table portion 1. On the inside upper edge of the stationary table portion 1 is mounted an angle molding 29. The rotary portion is rabbeted around its lower edge, and an angle molding 30 is secured to the exposed edge of the portion 6 extending above the stationary member, and to the under cut of the rabbet. The moldings 29 and 30 overlap, and in the event that the rotary table tilts, the two moldings will come into contact forming a bearing surface. The moldings may be made of aluminum, plastic or the like and secured in conventional manner to the table portions. A switch 40 secured to the underside of the stationary portion controls the motor. A power line (not shown) may be provided for the motor by conventional means.

From the description of the particular embodiment of my invention, a number of advantageous features are apparent. The bearing surface provided by the moldings on the edges of the revolving table-portion and the stationary-table portion will allow unbalancing the rotary portion by heavy objects with no binding and little loss of efficiency. The support of the shaft allows smooth rotation under under unbalanced loads. The spring mounted motor permits the table to be stopped, with the wheel spinning against the rotary member, without damage to the motor. On release of the table it immediately starts revolving. The adjustability of the speed of the revolving portion provides easy control of the table. The rotary table portion is only slightly higher than the stationary portion. It is, thus, more adaptable to the various occasions in which the apparatus may be used.

Having thus described the invention is is readily apparent that the arrangement of parts is variable and can still provide a new type of revolving lazy-susan table. Thus, I do not wish to be limited to my specific arrangement but rather by the spirit and scope of my invention.

I claim:
1. In a motorized lazy-susan table including a stationary table portion having means for supporting the same, a rotary table portion, and means for rotating said rotary portion, the improvement of shaft means depending downwardly and center-wise from said rotary portion, a tube telescoped over said shaft and supported on said stationary table support means, a thrust bearing mounted on said tube for supporting said shaft and said rotary table portion in juxtaposition with said stationary table portion, a circular bearing set intermediate the ends of said shaft mounted on said means supporting said stationary table portion preventing lateral movement of said shaft, and said means for rotating said rotary portion includes an electric motor having a shaft mounted soft rubber wheel frictionally engaged with the bottom of said rotary table portion.

2. The improvement in a motorized lazy-susan table according to claim 1 wherein said means for rotating said rotary portion includes a spring metal mount for said electric motor for holding said soft rubber-tired wheel in frictional contact with the underside of said rotary portion.

3. The improvement in a motorized lazy-susan table according to claim 1 wherein said means for supporting said stationary member includes a lateral brace member, and said electric motor is radially adjustably mounted on said brace for selectively controlling the speed of rotation of said rotary portion.

4. The improvement in a motorized lazy-susan table according to claim 4 wherein said metal strip is bolted to said lateral brace member and is adjustable by loosening said bolts and moving said electric motor along said brace member.

5. The improvement in a motorized lazy-susan table according to claim 1 wherein said rotary table portion is cut from said stationary table portion and has a molding peripherally thereof and said stationary table portion has a molding around the opening from which said rotary table portion was cut, and said molding are constructed to overlap and form a bearing surface therebetween in case of rotary table portion tilt.

References Cited

UNITED STATES PATENTS

| 1,028,670 | 6/1912 | Brock et al. | 108—20 |
| 1,071,004 | 8/1913 | Goodrich | 108—20 |
| 1,143,279 | 6/1915 | Johnson | 108—20 |
| 1,444,042 | 2/1923 | Schwalbach | 108—20 |
| 1,534,557 | 4/1925 | Williams | 108—20 |
| 1,608,704 | 11/1926 | McConaha | 108—20 |
| 2,494,242 | 1/1950 | Hardy | 108—20 X |

CASMIR A. NUNBERG, *Primary Examiner.*

GLENN O. FINCH, *Assistant Examiner.*